United States Patent Office 3,574,515
Patented Apr. 13, 1971

3,574,515
PROCESS FOR DYEING AND PRINTING OF CELLULOSE FIBRE MATERIALS USING A COPPER AMMINE COMPLEX OF TRIMETHYLAMINE-TRICARBOXYLIC ACID
Andreas Huppertz, Cologne-Mulheim, and Gunther Naumann and Walther Wolf, Leverkusen, and Hellmut Berg, Leverkusen-Mathildenhof, Germany, assignors to Farbenfabriken Bayer Aktiengesellschaft, Leverkusen, Germany
No Drawing. Filed July 5, 1968, Ser. No. 742,705
Claims priority, application Germany, July 15, 1967, F 52,977
Int. Cl. D06p 3/60
U.S. Cl. 8—54.2                                    3 Claims

ABSTRACT OF THE DISCLOSURE

In the dyeing and printing of cellulose fibre materials, the fibre is treated with an imino-isoindolenine in the presence of a copper ammine complex of trimethylamine-tricarboxylic acid.

---

The present invention relates to a process for dyeing and printing of fibre materials. More particularly it concerns a process wherein the dyeing and printing is carried out by treating the fibre materials with an imino-isoindolenine in the presence of a copper ammine complex of trimethylamine-tricarboxylic acid and subsequent heating of the fibre materials.

It is known that phthalocyanine dyestuffs can be produced on the fibre by applying imino-isoindolenines onto the materials to be dyed, preferably in the presence of metal compounds, such as copper or nickel compounds, in a soluble form, and subsequently producing the phthalocyanines on the fibre by a heat treatment from the imino-isoindolenines (cf. British patent specification No. 698,039, and "Angewandte Chemie" 68 (1956), pp. 133 to 150, Baumann, Bienert, Rösch, Vollmann, Wolf: "Isoindolenine als Zwischenprodukte der Phthalocyanin-synthese").

We have now found that particularly good results are obtained in producing copper-containing phthalocyanine dyestuffs from imino-isoindolenines if the imino-isoindolenines are brought onto the fibre materials in the presence of copper ammine complexes of trimethylamine-tricarboxylic acid.

The bringing up onto the fibre materials can be performed according to the processes usually applied for the dyeing and printing with phthalocyanine-deystuffs which are produced from imino-isoindolenines on the fibre material.

The copper ammine complexes of trimethylamine-tricarboxylic acid to be used according to the invention can be obtained by reacting copper salts, such as copper sulphate, copper acetate or copper chloride, in aqueous ammonia with trimethylamine-tricarboxylic acid, preferably in the form of the alkali metal salts. It is expedient for this purpose to dissolve first the copper salt, e.g. the copper sulphate, in water. It is advantageous to use water which is as salt-free as possible and to carry out the reaction in such vessels which do not deliver metal compounds in the copper salt solutions. An aqueous ammonia or amine solution is then added to the solution of the copper salt. As amines there may be used, for example, un-substituted amines, such as methyl-, ethyl-, propyl-, butyl- and cyclohexylamine, or substituted amines, such as ethanolamine and propanolamine.

The amount of the ammonia or amine to be added depends upon the composition of the copper ammine complex which is to be achieved. It is not necessary that such amount of ammonia or amine is added that the tetrammine salt is obtained. It is also sufficient to produce the diammine or triammine salt. When the formation of the copper ammine complex salt is thus achieved, the trimethylamine-tricarboxylic acid (nitrilo-triacetic acid) is added to form the copper trimethylamine-tricarboxylic acid complex. As has already been mentioned the alkali metal salts, such as the trisodium salt of trimethylamine-tricarboxylic acid, are preferably used. The pH value desired for the final dyeing, e.g. pH 8 to 10.5, can subsequently be adjusted, for example, by the addition of a mineral acid. In the production of the copper ammine complexes of trimethylamine-tricarboxylic acid, accompanying salts are necessarily formed, the solubility of which largely determines the concentration of the copper complex salts respectively the copper content of the solutions. Thus, for example, there is formed, in the reaction of copper sulphate or copper ammine sulphate with the trisodium salt of trimethylamine-tricarboxylic acid, sodium sulphate which, as a hydrate compound, tends to crystallise from concentrated solutions or is salted out by the presence of the complex salts formed according to the invention. The separation of such accompanying salts can be increased or diminished by the use of other anions. If the sulphate ion is replaced e.g. by the chloride or acetate ion accompanying salts of a higher solubility are obtained which enable a higher concentration to be achieved. In a corresponding way higher concentrations can be attained when, instead of the sodium salts, the potassium or ammonium salts of the trimethylamine-tricarboxylic acid are used. Furthermore, the solubility of the complex depends to a large extent upon the added amount of the amine or the ammonia. By changing the pH value, the composition and the stability of the copper ammine complexes of the trimethylamine-tricarboxylic acid can be influenced. In the case of the copper(II)-salt, there is formed, e.g. at a pH value of 6, a complex which consists of one gram-atom copper and one mol of the trimethylamine-tricarboxylic acid. In a pH range of 8 to 10.5 a complex is mainly formed which contains for one gram-atom copper two mols of trimethylamine-tricarboxylic acid. The second complex exhibits a lower stability than the 1:1-complex.

Dependent upon the conditions desired for the dyeing, copper ammine complexes of the most apted stability can be prepared by the choice of the accompanying salts and the pH value. Examples of some typical copper ammine complex salts are the following:

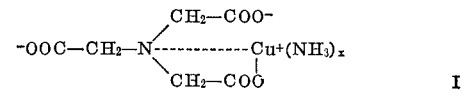

I

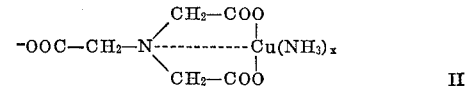

II

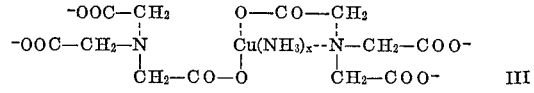

III

In the above formulae, other amines may also be contained in place of ammonia. The negative valencies of the carboxyl groups may be neutralised as desired, by different cations, preferably sodium, potassium or ammonia. In the case that the copper-II-ion possesses still a free valency, this may be neutralized by $xSO_4$—, Cl—, $CH_3COO^-$ or other apted anions ($x$: monovalent cation).

As imino-isoindolenine there may be used the imino-isoindolenines customarily used for producing phthalocyanine dyestuffs on the fibres. It is here chiefly a question of 1-amino-3 - imino-isoindolenines such as the unsubstituted (IV) and the (V, VI) containing a phenyl or alkoxy substituent in the 5- or 6-position, or 1,3-diimino-isoindolenines which are tautomeric with these isoindolenines and correspond to the formula

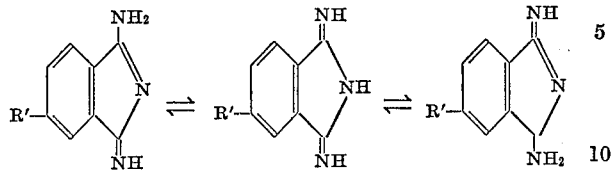

IV: R'=H
V: R'=C$_6$H$_5$
VI: R'=O—CH$_3$, O—C$_2$H$_5$

Those 3-imino-isoindolenines may also be used which carry in the 1-position alkoxyl groups (VII) and the dialkoxy compounds (VIII) derived therefrom by addition of a further molecule alcohol.

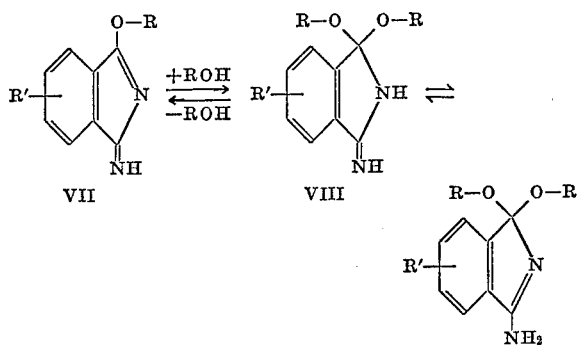

The copper ammine complexes of the trimethylamine-tricarboxylic acid may be added to the dyeing liquors respectively printing pastes either as powders or in the form of aqueous solutions.

The amounts in which the copper ammine complexes of trimethylamine-tricarboxylic acid are added to the dyeing liquors respectively printing pastes may vary within wide limits; in general it has proved to be of advantage when they are used in such amounts that in the dyeing liquors respectively printing pastes there is present 1 gram-atom copper for 4 to 6 moles imino-isoindolenine compound.

By means of the copper ammine complexes of the trimethylamine-tricarboxylic acid clearer dyeings in deeper shades and blue dyeings in a more reddish shade are achieved than were obtained until now.

The parts given in the following examples are parts by weight.

EXAMPLE 1

The reaction is started with:

1000 parts of desalted water,
280 parts copper sulphate are introduced and dissolved at 40° C., pH value of the solution: 2.5,
190 parts 20% aqueous ammonia are added, pH value of the suspension such obtained: 6.7,
370 parts trimethylamine-tricarboxylic acid (tri-sodium salt) are introduced and completely dissolved within one hour, while stirring; pH value of the solution: 11.1.

The solution is then buffered with 120 parts 30% aqueous hydrochloric acid to give a pH 9.2.

The mixture is allowed to stand for 2–3 days without stirring. Then the precipitated metal hydroxides are filtered off.

There are obtained 1920 parts of a blue solution (solution D=1.213; copper content: 3.8%).

EXAMPLE 2

1000 parts of a solution obtained according to Example 1 with a copper content of 3.8% are evaporated to dryness at 25° C. in a vacuum and after-dried at 60° C. Yield: 300 parts of a pale blue powder. Copper content of the powder: 12.1%.

EXAMPLE 3

The reaction is started with:

1000 parts of desalted water,
280 parts copper sulphate are introduced and the mixture is dissolved at 40° C.; pH value of the solution: 2.5,
190 parts 20% aqueous ammonia are added, pH value of the suspension: 6.7,
370 parts trimethylamine-tricarboxylic acid (tri-sodium salt) are introduced and dissolved within one hour, while stirring, pH value of the solution: 11.1. The solution is then evaporated to dryness at 100° C.; there are obtained 535 parts of a pale blue powder containing 13.4% Cu. The powder is mixed with 268 parts of desalted water; the product is filtered off and washed with 268 parts of desalted water and dried;

there are obtained 286 parts of a powder with a copper content of 15.5%.

EXAMPLE 4

The reaction is started with:

1000 parts of desalted water;
225 parts copper acetate are introduced, pH value of the obtained suspension: 4.7,
115 parts 20% aqueous ammonia are added; pH value of the solution: 6.5,
370 parts trimethylamine-tricarboxylic acid (tri-sodium salt) are introduced, while cooling, at 20–25° C. and the mixture is stirred for one hour; pH value of the solution: 11.1. It is then buffered with
40 parts 30% aqueous hydrochloric acid to a pH of 9.2 and then evaporated to dryness at 60° C. in a vacuum;

there are obtained 585 parts of a pale blue powder; copper content: 12.0%.

EXAMPLE 5

1000 parts of the powder with a copper content of 12.0%, obtained according to Example 4, are mixed at room temperature with:

500 parts of distilled water, filtered off and washed cold with 500 parts of distilled water. The product is dried at 60° C. in a vacuum.

There are obtained 600 parts of a pale blue powder with a copper content of 18.1%.

EXAMPLE 6

The reaction is started with:

1000 parts desalted water,
225 parts copper acetate are introduced, pH value of the suspension: 4.7,
90 parts 20% aqueous ammonia are added, pH value of the suspension: 6.5,
60 parts 30% aqueous methylamine are adde, pH value of the suspension: 9.0,
370 parts trimethylamine-tricarboxylic acid (tri-sodium salt) are added at 20–25° C. while cooling and the mixture is stirred for one hour; pH value of the solution: 12.3. It is buffered with 160 parts 30% aqueous hydrochloric acid to pH 9.1. The 2080 parts of the blue solution (D=1.18) such obtained are evaporated to dryness at 100° C.

There remain 6.35 parts of a pale blue powder with a copper content of 9.5%.

EXAMPLE 7

The reaction is started with:

1000 parts of desalted water,
280 parts copper sulphate are introduced, pH value of the solution: 2.5,
500 parts 30% aqueous methylamine are added, pH value of the solution: 10.6,
370 parts trimethylamine-tricarboxylic acid (tri-sodium salt) are added and the solution is stirred for one hour, pH value of the solution: 12.5; it is buffered with
360 parts 30% aqueous hydrochloric acid to pH 9.1. The solution is allowed to stand for 2 days without stirring and it is then filtered off from the precipitated iron hydroxide; there are obtained
2420 parts of a blue solution (D=1.164; copper content: 2.9%) which are then evaporated to dryness at 100° C. to give
700 parts of a pale blue powder containing 10.5% Cu. The powder is mixed with
350 parts distilled water, filtered off and washed with 350 parts distilled water and dried.

There are obtained 282 parts of a pale blue powder with a copper content of 17.3%.

EXAMPLE 8

The reaction is started with:

1000 parts desalted water,
280 parts copper sulphate are dissolved at 40° C., pH value of the solution: 2.5,
500 parts N-butylamine are added to give a suspension of pH 10.8;
570 parts trimethylamine-tricarboxylic acid (tri-sodium salt) are introduced and the mixture is stirred for one hour. The suspension the pH value of which is 12.3 is mixed with
500 parts 30% aqueous hydrochloric acid. The solution the pH value of which is 9.1 is allowed to stand for 2 days without stirring and is then filtered off from precipitated iron hydroxides; there are obtained
2500 parts of a blue solution (D=1.19; copper content: 2.8%) which are then evaporated to dryness at 100° C. to give
1170 parts of a pale blue powder containing 5.8% Cu. This is then mixed with
585 parts desalted water, filtered off and washed with 585 parts desalted water and dried.

There are obtained 460 parts of a pale blue powder with a copper content of 8.3%.

EXAMPLE 9

The reaction is started with:

1000 parts desalted water,
215 parts copper chloride are introduced and dissolved,
400 parts trimethylamine-tricarboxylic acid (tri-sodium salt) are added,
215 parts of a 50% aqueous ethylamine solution are admixed and the mixture is dissolved within one hour, while stirring. The solution is then buffered with about
220 parts 30% aqueous hydrochloric acid to a pH of 9.2. The solution is allowed to stand for 2-3 days without stirring and is then filtered.

There are obtained 2048 parts of a blue solution (copper content: 4.0%).

EXAMPLE 10

The reaction is started with:

1000 parts desalted water,
220 parts copper chloride are introduced and dissolved,
400 parts trimethylamine-tricarboxylic acid (tri-sodium salt) are introduced,
200 parts 20% aqueous ammonia are added and the mixture is completely dissolved within one hour while stirring.

The solution is buffered to pH 9.0 with about 75 parts 30% aqueous hydrochloric acid, allowed to stand for 2-3 days without stirring and is then filtered; 100 parts desalted water are added. There are obtained 2000 parts of a blue solution (copper content: 4.0%).

EXAMPLE 11

The reaction is started with:

1000 parts desalted water,
310 parts copper sulphate are introduced and dissolved,
375 parts trimethylamine-tricarboxylic acid (tri-ammonium salt) are introduced,
140 parts 20% aqueous ammonium are added,
200 parts desalted water are added and the mixture is completely dissolved within one hour while stirring. It is then buffered to pH 9.1 with 20% aqueous ammonia and allowed to stand for 2-3 days without stirring.

There are obtained 2000 parts of a blue solution with a copper content of 4.0%.

EXAMPLE 12

The reaction is started with:

1000 parts desalted water,
315 parts copper sulphate are introduced and dissolved,
420 parts trimethylamine-tricarboxylic acid (tri-sodium salt) are added,
120 parts 20% aqueous ammonia are admixed and the mixture is completely dissolved within one hour, while stirring,
30 parts urea are then added and dissolved; the solution is then buffered with about
18 parts 30% aqueous hydrochloric acid to pH 9. The solution is allowed to stand for 2-3 days without stirring. After filtering
100 parts desalted water are added.

There are obtained 2000 parts of a blue solution (copper content: 3.9%).

EXAMPLE 13

A mercerised, bleached cotton fabric is impregnated with an aqueous liquor which contains per litre:

20 parts 1-amino-3-imino-isoindolenine and
42 parts of the solution obtained according to Example 1,
20 parts methanol,
20 parts polyglycol ether,
30 parts triethylene glycol and
70 parts urea and which has been filtered before use through a grey cotton cloth. After squeezing to a weight increase of 100% and drying, the material is condensed at 140° C. for 20 minutes, rinsed with hot water, acidified, again rinsed and then soaped. It is then again rinsed first warm, then cold and dried. A clear blue dyeing is obtained.

EXAMPLE 14

The procedure is the same as that described in Example 13, but instead of the 42 parts of the solution obtained according to Example 1, 13 parts of the powder obtained according to Example 2 are used.

A brilliant clear dyeing is obtained.

EXAMPLE 15

The procedure is the same as that described in Example 13 but, instead of the 42 parts of the solution obtained according to Example 1, 10 parts of the powder obtained according to Example 3 are used.

A brilliant clear dyeing is obtained.

EXAMPLE 16

The procedure is the same as that described in Example 13 but, instead of the 42 parts of the solution obtained according to Example 1, 13 parts of the powder obtained according to Example 4 are used.

A brilliant clear dyeing is obtained.

EXAMPLE 17

The procedure is the same as that described in Example 13 but, instead of the 42 parts of the solution obtained according to Example 1, 9 parts of the powder obtained according to Example 5 are used.

A brilliant clear dyeing is obtained.

EXAMPLE 18

The procedure is the same as that according to Example 13 but, instead of the 42 parts of the solution obtained according to Example 1, 9 parts of the powder obtained according to Example 6 are used.

A brilliant clear dyeing is obtained.

EXAMPLE 19

The procedure is the same as that according to Example 13 but, instead of the 42 parts of the solution obtained according to Example 1, 9 parts of the powder obtained according to Example 7 are used.

A brilliant clear dyeing is obtained.

EXAMPLE 20

The procedure is the same as that according to Example 13 but, instead of the 42 parts of the solution obtained according to Example 1, 19 parts of the powder obtained according to Example 8 are used.

A brilliant clear dyeing is obtained.

EXAMPLE 21

A mercerised, bleached cotton fabric is impregnated with an aqueous liquor which contains per litre:

20 parts 1-amino-3-imino-6-phenyl-isoindolenine,
8 parts of the powder obtained according to Example 5,
100 parts methanol,
70 parts polyglycol ether,
30 parts triethylene glycol,
70 parts urea and
20 parts 30% acetic acid and which is filtered before use through a grey cotton cloth. After squeezing to a weight increase of 100% and drying, the material is condensed at 140° C. for 20 minutes, rinsed with hot water, acidified, again rinsed and then soaped. It is then again rinsed first warm and then cold, and dried.

A brilliant green dyeing is obtained. A similar dyeing is obtained when the acetic acid is omitted.

EXAMPLE 22

A print is prepared as follows:

5 parts 1-amino-3-imino-isoindolenine,
15 parts of a glyocol ether solvent,
3 parts of the powder prepared according to Example 2, 50 parts wheat starch/tragacanth thickening 65/100 are made up to 100 g. with distilled water and stirred to give a printing paste. With this paste a bleached grey cotton cloth is then printed, dried at 140–150° C. and steamed for 10 minutes. The material is then acidified, thoroughly rinsed, soaped at the boil, rinsed and dried.

A brilliant blue print is obtained.

EXAMPLE 23

The procedure is the same as in Example 22 but, instead of the 3 parts of the powder obtained according to Example 2, there are used (a) 3 parts of the powder prepared according to Example 4, or
(b) 2 parts of the powder prepared according to Example 5.

Brilliant blue prints are obtained.

What we claim is:

1. In the known process for dyeing and printing cellulose fibre materials with an imino-isoindolenine in the presence of a copper complex compound and subsequent heating of the fibre material, the improvement which consists of using as the copper complex compound a copper ammine complex of trimethylamine-tricarboxylic acid.

2. In the process of claim 1, the copper complex compound being the reaction product of a copper salt with trimethylamine-tricarboxylic acid in the form of a salt selected from the group consisting of ammonium and alkali metal salts.

3. Cellulose materials dyed and printed according to the process of claim 1.

References Cited

UNITED STATES PATENTS 2,683,643   7/1954   Baumann et al. ---------- 8—1

GEORGE F. LESMES, Primary Examiner

P. C. IVES, Assistant Examiner

U.S. Cl. X.R.

8—1; 260—314.5, 314